United States Patent [19]

Mamish

[11] Patent Number: 5,227,225
[45] Date of Patent: Jul. 13, 1993

[54] MASKING TAPE

[75] Inventor: Abboud L. Mamish, Natick, Mass.

[73] Assignee: The Kendall Company, Mansfield, Mass.

[21] Appl. No.: 755,882

[22] Filed: Sep. 6, 1991

Related U.S. Application Data

[63] Continuation of Ser. No. 385,115, Jul. 26, 1989, abandoned, which is a continuation-in-part of Ser. No. 179,185, Apr. 8, 1988, abandoned.

[51] Int. Cl.$^5$ .................................................. C09J 7/02
[52] U.S. Cl. .................................... 428/214; 428/216; 428/286; 428/290; 428/351; 428/354
[58] Field of Search ............... 428/343, 351, 354, 509, 428/510, 214, 216, 286, 290

[56] References Cited

U.S. PATENT DOCUMENTS

| | | | |
|---|---|---|---|
| 2,953,482 | 9/1960 | Scherber | 428/509 |
| 3,311,498 | 3/1967 | Massengale | 428/510 |
| 3,900,674 | 8/1975 | Coffman | 428/355 |
| 4,147,580 | 4/1979 | Buell | 428/198 |
| 4,284,457 | 8/1981 | Stonier | 428/116 |
| 4,454,192 | 6/1984 | Suzuki | 428/344 |
| 4,551,388 | 11/1985 | Schlademan | 428/510 |
| 4,636,427 | 1/1987 | Ohno | 428/354 |
| 4,693,920 | 9/1987 | Agarwal | 428/354 |
| 4,705,715 | 11/1987 | DeCoste | 428/354 |
| 4,740,416 | 4/1988 | DeCoste | 428/354 |
| 4,772,499 | 9/1988 | Greenway | 428/354 |
| 4,784,653 | 11/1988 | Bolton | 428/354 |

FOREIGN PATENT DOCUMENTS 0562975  9/1958  Canada .............................. 428/508

*Primary Examiner*—Jenna L. Davis
*Attorney, Agent, or Firm*—Al Isaacs

[57] ABSTRACT

Novel methods for preparing masking tapes by coating a thin layer of a polyolefinic material onto a lightweight nonwoven cloth and then applying a layer of adhesive, preferably a hot melt adhesive onto the opposed surface of the nonwoven cloth; and novel masking tapes prepared thereby.

In the preferred embodiments, the polyolefinic layer consists essentially of a thin stratum of a high density polyethylene and a thin layer of low density polyethylene.

4 Claims, No Drawings

MASKING TAPE

This application is a continuation, of application Ser. No. 385,115, filed Jul. 26, 1989 now abandoned, which is a continuation-in-part of Ser. No. 179,185, filed Apr. 8, 1988, now abandoned.

BACKGROUND OF THE INVENTION

The present invention relates to finger-tearable adhesive tapes of the class known in the art of masking tapes.

While the patent literature is replete with references to masking tapes, those commercially available today employ a crepe paper base or backing for the pressure-sensitive adhesive layer. This paper base is first saturated with a latex binder and then dried. A release coating may then typically be applied to one side of this paper base and a pressure-sensitive adhesive to the other.

The saturation step with the latex binder to improve cohesive strength of the paper and the application of the release coating to provide ease of unwind of the tape both require energy for solvent removal.

A primary object of this invention is to provide a more cost-effective method for manufacturing masking tapes.

Another object is to provide masking tapes having improved elongation and conformability.

Other objects of the invention will be apparent from the following detailed description of the invention.

BRIEF DESCRIPTION OF THE INVENTION

In accordance with the present invention, the aforementioned objectives are accomplished by utilizing only solid coatings in the masking tapes.

Specifically, the novel masking tapes of this invention are prepared by coating a thin layer of a polyolefinic material onto a light weight nonwoven cloth and then applying a layer of pressure-sensitive adhesive, preferably a hot melt adhesive, onto the nonwoven cloth.

In the preferred embodiment, the polyolefinic layer consists essentially of a thin stratum of low density polyethylene and the strata are formed by coextrusion.

DETAILED DESCRIPTION OF THE INVENTION

As was previously mentioned, the novel masking tapes of this invention comprise: (1) a polyolefinic backing layer; (2) a light weight nonwoven, preferably of the type known as chemically bonded; and (3) a layer of a pressure-sensitive adhesive.

It will of course be appreciated that the nonwoven is not present as a discrete layer. Rather, the coated polyolefinic backing layer will both coat the surface of the cloth and invade its interstices, so that the cloth may be said to be "embedded" in the backing layer as well as being mechanically bonded or laminated thereto.

The polyolefin backing layer of the masking tape can be described as being multi-functional in the sense that it acts as a sealant to the discontinuous nonwoven surface; serves as a barrier layer against adhesive migration; provides ease of unwind from a roll of the tape, thereby elimination the need for a release agent treatment; and, additionally, acts as a reinforcement to the nonwoven cloth which is characterized as possessing poor crossdirectional tear characteristics and tensile strength.

The coated cloth, which may be considered as the backing for the adhesive layer, provides excellent "finger-tearability", i.e. cross-tear properties, as well as elongation and improved tensile strength. The nonwoven, with its apertured discontinuous surface, in turn provides improved anchorage of the adhesive to the film backing in the resulting laminate, in view of the fact that a portion of the adhesive layer is anchored to the polyolefin backing layer.

In theory, any of the polyolefinic materials heretofore employed in the art as backing layers for adhesive tapes may be employed in the practice of this invention. As examples of such materials, mention may be made of the polyethylenes, e.g. low density (LDPE), high density (HDPE), very low or ultra low density (VLDPE), and linear low density (LLDPE) polyethylene. Other useful polyolefins which may be used alone or in combination, e.g. with polyethylene, include ethylene vinyl acetate copolymers, ethylene propylene rubber, EPDM, polypropylene, polyvinyl chloride, polyisobutylene, conjugated diene butyl, etc.

As previously mentioned, in the preferred embodiment of this invention, the backing layer is what may be termed a two-layer backing consisting essentially of an outer layer of HDPE and an inner layer of LDPE. In this preferred embodiment, the two-layer backing may be formed by coextrusion coating it onto the nonwoven cloth. In any event, the combined thickness of the two layers will be no greater than about 3.0 mils and, most preferably, will be on the order of about 1.5 to about 2.0 mils. The ratio of thickness of the HDPE and LDPE in this two-layer backing will be on the order of from about 7:8 to about 1:8. While the aforementioned two-layer backing is the preferred form of the invention, it will be appreciated that where found desirable or expedient to do so, a tie coat may be employed between the backing layer(s) and the nonwoven.

The particular HDPE and LDPE to be employed may be any of those known in the art. By way of illustration, excellent results are obtained utilizing HDPE and LDPE commercially available from Chevron Chemical under the trade designations 9116 and 4560, respectively. 9116 high density polyethylene resin has a density of 0.958 gram/cubic centimeter; and 4560 low density polyethylene resin has a density of 0.923 gram/cubic centimeter.

An important aspect of this preferred embodiment of the invention is the improved tensile strength obtainable by employing the two-layer HDPE/LDPE backing layer over LDPE alone. While LDPE is more cost-effective and conformable than HDPE, replacing some of the thickness of the backing layer with HDPE has been found to provide the requisite tensile strength for the contemplated masking tape which is not obtainable by employing LDPE alone.

The following table illustrates the improved tensile strength obtainable with the HDPE/LDPE two-layer backing over LDPE alone,

TABLE 1

| # | Resin | Density (g/cm³) | Melt Index (g/10 min) | Thickness (mils) | *Tensile Strength (lb/in) | Elongation (percent) |
|---|---|---|---|---|---|---|
| 1 | LDPE | .923 | 3.5 | 2.0 | 10 | 8 |
| 2 | LDPE | .917 | 12.0 | 1.5 | 9 | 8 |
| 3 | LDPE | .923 | 10.0 | 1.5 | 9 | 8 |
| 4 | LDPE | .923 | 10.0 | 2.0 | 11 | 9 |
| 5 | HDPE/LDPE | .958/.923 | 30/10 | 1.4/0.6 | 14 | 13 |
| 6 | HDPE/LDPE | .958/.923 | 30/10 | 1.0/0.5 | 12 | 13 |
| 7 | HDPE/LDPE | .958/.923 | 30/10 | .75/.75 | 11 | 9 |

*resin to nonwoven cloth

The nonwoven cloth to be employed will preferably be any of the synthetic nonwovens heretofore known in the art. Suitable synthetic fibers include the rayons, polyesters, polyamides, acrylics, etc. As is known, the fibers may first be carded to orient them primarily in the machine direction. The carded fibers may then be subjected to scrambling, after which they may be chemically or thermally bonded, or hydroentangled to produce the nonwoven fabric, all in per se known manner in the art.

Preferably, however, the nonwoven will be chemically bonded, i.e. the fiber web will be contracted with one or more of the known bonding agents in known manner such as by impregnation, printing, etc. Useful binders for this purpose include acrylics, vinyl acrylics, acetate/ethylene, polyvinyl acetate, polyesters, etc.

The adhesives employed to prepare the novel masking tapes of this invention may be any of those heretofore employed in the art for preparing masking tapes, the selection of which per se comprises no part of this invention. Preferred are those known in the art as "hotmelt" adhesives, which adhesives are characterized as being novolatile adhesives made of synthetic resins and plasticizers and applied to the backing hot in the molten state. As those skilled in the art will appreciate, the adhesive should be sufficiently aggressive to adhere well to the contemplated substrates, e.g. glass, metal, plastic, etc., but should also be characterized as having good unwind from the adhesive tape roll and no discernible adhesion stick after removal.

By way of illustration, suitable adhesives of this general description include rubbery block copolymers containing a polyisoprene midblock such as are disclosed in U.S. Pat. No. 4,699,941 or the hotmelt adhesives disclosed, for example, in U.S. Pat. Nos. 4,623,698; 4,636,555; 4,669,163; 4,698,242; 4,698,405 or 4,717,749.

In any event, the selected adhesive will be applied in a layer not thicker than about 2.0 mils, and preferably in a layer on the order of one mil thick.

The manner of applying the adhesive to the nonwoven cloth also is not critical to the practice of this invention. Preferably, it is applied by using a hot melt applicator. However, other modes of application such as solvent coating, extrusion coating, and the like may also be employed.

As was previously mentioned, in the preferred embodiment, the polyolefinic backing layer consists essentially of a two-layer backing, namely a thin HDPE and a thin LDPE stratum. While not critical to the practice of this invention how the two strata are applied, a particularly efficacious way of doing so is by coextrusion utilizing per se known coextrusion techniques.

In general, such known coextrusion techniques employ one or more extruders, each delivering a single component polymer melt (in this case HDPE/LDPE) to a combining feedblock which streamlines, combines and feeds the polymers to a single- or multimanifold coat hanger die which in turn feeds the two-layered film into a roll/nip where the cloth web is fed simultaneously at that point to form the backing layer/nonwoven laminate. Standard single screw extruders may be employed to melt and pump the individual layers into the coextrusion feedblock or die, as the case may be. High extrusion temperature profiles, e.g. 500°-600° F., are advisable in this stage as well as in the feedblock and die stages. These high temperatures will improve the bonding mechanism of the coextruded layers to the cloth.

Preferably, the feed pipes connecting the extruders to the feedblock should be kept to the shortest length possible to avoid long residence time which may result in polymer degradation as well as high pressure drop that could cause melt surges.

The dies employed in the extrusion coating applications typically consist of a single- or multimanifold coat hanger design with a tear drop cross section and narrow land length. This design facilitates better control over the thin film thicknesses through gradual and continuous build up of head pressure.

Since the coextrusion techniques, as described briefly above, are well known in the art, such details as barrel and die temperature, screwspeeds and the like will be well understood and a further detailed description is not necessary for a clear understanding of the invention.

The following examples show by way of illustration and not by way of limitation the practice of this invention.

EXAMPLE 1

A mixture of 95% LDPE and 5% of a 50/50 blend of a color pigment and LDPE (total contents: 97.5% by weight LDPE and 2.5% by weight pigment); and a mixture of 95% HDPE and 5% of a 50/50 blend of color pigment and HDPE (total contents: 97.5% HDPE and 2.5% pigment) were coextruded onto a rayon nonwoven cloth weighing 17 grams per square yard to provide a two-layer backing wherein the outer layer was a 1.3 mil thick LDPE layer and the inner layer bonded to the cloth was a 0.7 mil HDPE layer. The processing conditions for the extrusion coating was as follows:

| | Extruder 1 | Extruder 2 |
|---|---|---|
| Temp., barrel zone 1 | 350° F. | 350° F. |
| Temp., barrel zone 2 | 450° F. | 450° F. |
| Temp., barrel zones 3, 4, 5 | 550° F. | 550° F. |
| Temp., Adapter | 550° F. | 550° F. |
| Temp., Die zones 1-5 | 550° F. | 550° F. |
| Melt temp. | 550° F. | 550° F. |
| RPM | 87 | 51 |

-continued

|  | Extruder 1 | Extruder 2 |
| --- | --- | --- |
| Head Pressure (psi) | 1100 | 1200 |
| Output (psi) | 87 | 255 |
| Line speed (ft/min) | 225 | — |
| Nip roll pressure (psi) | 40 | — |

A styrene/isoprene block copolymer hot melt pressure sensitive adhesive (pale yellow color; softening point (Ring & Ball), 223°–233° F.; application temperature, 300°–330° F.; specific gravity, 0.93–0.97; solids content, 100%) was then applied to the opposed surface of the cloth by slot die coating using a hot melt applicator at a temperature of about 300° F. to provide an adhesive coating weighing about 20 grams per square yard, the coating being about one mil thick.

EXAMPLE 2

Example 1 was repeated, except that the adhesive coating was applied at a thickness calculated to be 0.8 mil.

EXAMPLE 3

Example 1 was repeated again, except that the adhesive coating was applied at a thickness calculated to be 0.7 mil.

The masking tape prepared in the foregoing manner, may then be slit into desired widths, e.g. one, two or three inch widths.

The tapes prepared in the foregoing examples were compared for adhesion, probe, unwind and elongation at 25° C. with six commercially available standard brand masking tapes (designated in the following table simply as Control 1 through Control 6, respectively).

The data for these comparative tests is set forth in Table 2. Since the data will vary slightly in repeat tests, for the sake of greater accuracy the numbers recited ar averages for several tests.

TABLE 2

| Test Sample | Adhesion/ Steel (oz/in) | Adhesion/ back (oz/in) | Probe (100 g) | Unwind 12"/min | Elong. |
| --- | --- | --- | --- | --- | --- |
| Example 1 | 43 | 32 | 311 | 28 | 13 |
| Example 2 | 33 | 28 | 198 | 21 | 13 |
| Example 3 | 23 | 19 | 176 | 13 | 13 |
| Control 1 | 35 | 21 | 233 | 21 | 4 |
| Control 2 | 61 | 22 | 327 |  | 6 |
| Control 3 | 24 | 11 | 90 |  | 7 |
| Control 4 | 47 | 25 | 342 |  | 8 |
| Control 5 | 36 | 14 | 145 |  | 11 |
| Control 6 | 33 | 18 | 183 |  | 10 |

As will be seen from the data on the Controls (commercial masking tape) in the foregoing table, there is a fairly wide range on the adhesion to steel and adhesion to backing, as well as the probe, thus indicating there appears to be no defined criteria for consumer acceptance of these physical qualities. In any event, it is clear that the novel tapes of this invention compare favorable in these aspects. Of particular interest is the markedly superior elongation of the tapes of this invention, thus confirming that this task of the invention has been solved.

Because of this increased elongation, the masking tapes of this invention have markedly improved ability to wrap around objects and strict conformance to the substrate shape. Such properties render the tapes particularly advantageous for such common usages for masking prior to painting. With respect to painting by auto body shops and the like, it has been observed that the novel tapes of this invention provide cleaner lines of paint, an important advantage of this invention.

Since certain changes may be made without departing from the scope of the invention herein involved, it is intended that all matter described in the foregoing description, including the examples, shall be interpreted as illustrative and not in a limiting sense.

What is claimed is:

1. A masking tape characterized by having improved elongation and conformability, said tape consisting essentially of, in order, an outer layer of high density polyethylene; an inner layer of low density polyethylene, the combined thicknesses of said outer and inner layers being no greater than about 3.0 mils; a nonwoven cloth; and a pressure-sensitive adhesive layer no thicker than about 2.0 mils.

2. A masking tape as defined in claim 1 wherein said adhesive is a hot melt adhesive.

3. A masking tape as defined in claim 2 wherein said cloth is chemically bonded.

4. A masking tape as defined in claim 1 wherein the ratio of thicknesses of said high density polyethylene layer to said low density polyethylene layer is from about 7:8 to about 8:1.

* * * * *